Jan. 15, 1963  E. J. DILLMAN ETAL  3,073,930
CONDITION CONTROLLER
Filed April 27, 1960  2 Sheets-Sheet 1

*INVENTORS*
EARNEST J. DILLMAN
THOMAS E. NOAKES
BY

Wilson, Lewis & McRae
ATTORNEYS

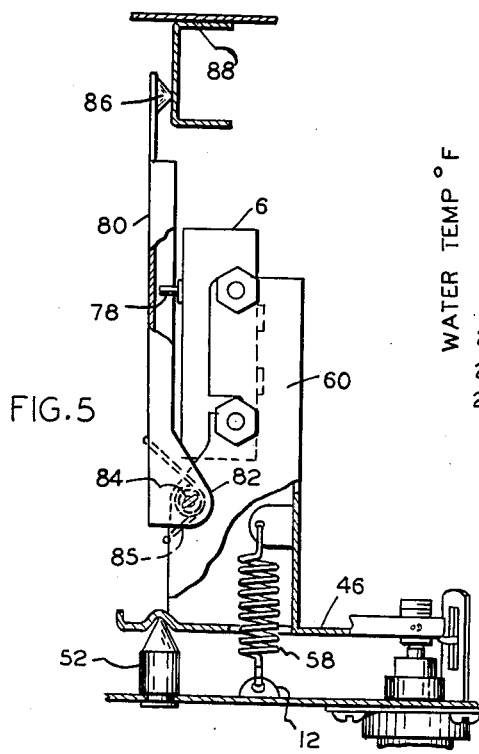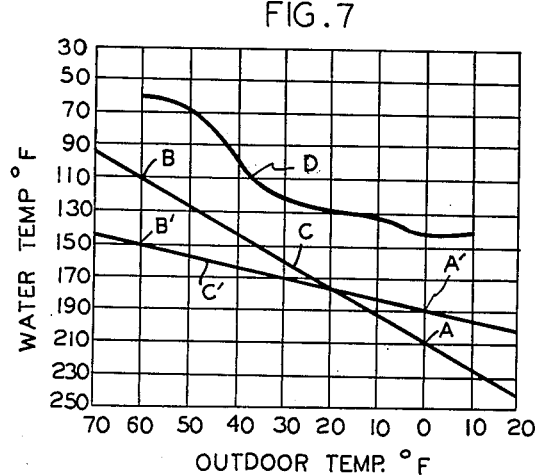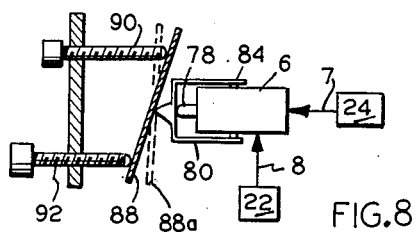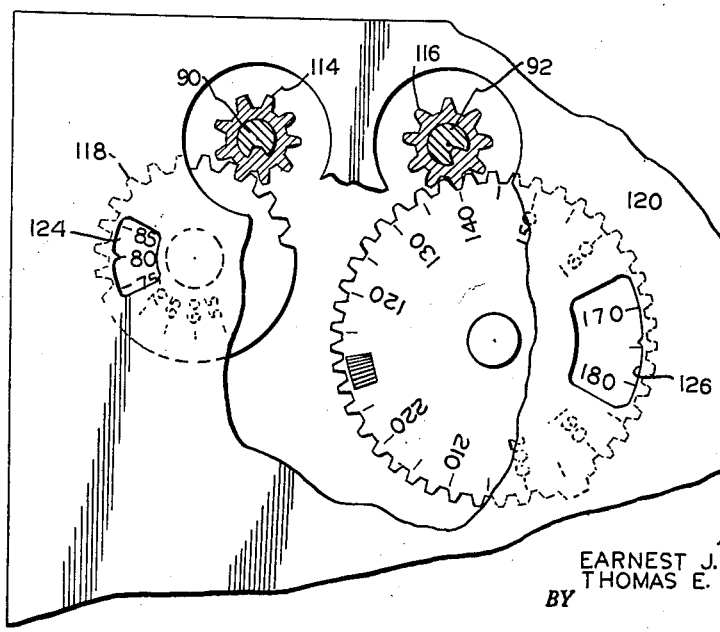
INVENTORS
EARNEST J. DILLMAN
THOMAS E. NOAKES
BY
WILSON, LEWIS & McRAE
ATTORNEYS 3,073,930
CONDITION CONTROLLER
Earnest J. Dillman and Thomas E. Noakes, Detroit, Mich., assignors to American Radiator & Standard Sanitary Corporation, New York, N.Y., a corporation of Delaware
Filed Apr. 27, 1960, Ser. No. 25,003
4 Claims. (Cl. 200—140)

This invention relates to a condition responsive control structure particularly designed to have its output signal varied in a preset pattern determined in accordance with variations in two independently fluctuating input signals or conditions. The invention has application in various fields, but as an example the invention may be utilized in the field of room or space heating wherein it is desired to control the heat producer in accordance with variations in the temperature conditions of two different media.

In certain types of room heating there is employed a heat producer comprising a furnace-boiler arrangement for circulating heat exchange fluid such as water through radiators located in the various rooms to be heated. In the spring and fall months when the outdoor temperature is relatively high, as for example 40° F., for reasons of economy it is not necessary or desirable that the boiler water temperature be relatively high; for example on outdoor temperatures of 40° F. a boiler water temperature of perhaps 130° F. may be sufficient to provide proper room heating. In the same system when the outdoor temperature is as low as 10° F. a higher boiler water temperature such as 190° F. may be desirable for proper heating.

From the above it will be seen that in the illustrative arrangement the furnace is preferably controlled by a mechanism which responds both to boiler water temperature and outdoor temperature. It will be understood that the actual room temperature may be varied and controlled by one or more conventional room thermostats and circulation pumps; for present purposes we are concerned only with varying the boiler water temperature in accordance with variations in outdoor temperature.

The problem of boiler water temperature control is complicated by the fact that different heating systems require different boiler water temperatures per given outdoor temperature condition. Thus, if the heating system is relatively small in relation to the room heating requirements a relatively high boiler water temperature may be required for any given outdoor temperature. Conversely, if the heating system is oversize in relation to the heat load then a lower boiler water temperature may be desirable for any given outdoor temperature. Therefore a satisfactory control structure for a wide variety of space heating systems should be designed to take into account the capacity of the system in relation to the heating load, as well as the previously discussed effect of the outdoor temperature.

It is realized that in commercial practice many of the control structures are installed as replacement items for original factory equipment. The installation operations are sometimes performed by persons having only a general understanding of the temperature control problems involved. Accordingly the control structure is preferably designed so that adjustment operations (to fit the control to different systems) are made quickly and easily by persons having only a general understanding of the problem to be solved by the adjustment.

With the above discussion in mind, it is a primary object of the present invention to provide a control structure which is responsive to variation in two different conditions. In a particular application the invention seeks to provide an improved boiler water temperature control which operates in response both to the boiler water temperature and to the outdoor temperature.

A further object of the invention is to provide a control structure which is responsive to variation in two different conditions and which may be adjusted to give any desired pattern of control in accordance with different load requirements of the device being controlled. In a particular application the invention seeks to provide an improved boiler water temperature control which may be utilized with systems having different heating loads.

A further object of the invention is to provide a control structure which is responsive to variations in two different conditions and which is capable of easy and quick adjustment to provide various selected relationships between the two conditions. In a particular application the invention seeks to provide an improved boiler water temperature control wherein the control operates in response to outdoor temperature variation and boiler water temperature variation in a preselected relationship (for desired heating during the different seasons), and wherein the preselected relationship may be changed and adjusted to fit the control structure to different heating systems.

A specific object of the invention is to provide a controller for a furnace-boiler assembly, wherein a thermostatic power device responsive to outdoor temperature is operatively utilized with a second thermostatic power device responsive to boiler water temperature, said temperature responsive devices operating on the controller independently of one another but in concert together so that the controller emits a signal so charactered as to provide a desired boiler water temperature during all heating seasons of the year.

It is a further object of the invention to provide an arrangement as described immediately hereabove, wherein the controller may be readily adjusted by unskilled personnel to fit furnace-boiler arrangements of different boiler water temperature requirements.

Another object is to provide a furnace control which takes into account variations in outdoor temperature, most economical boiler temperature per given outdoor temperature, and heat load on the boiler in relationship to its operating temperature.

A further object is to provide a materially improved furnace control which can be utilized with various different furnaces and in various different installations of the same furnace.

Other objects of this invention will appear in the following description and appended claims, reference being had to the accompanying drawings forming a part of this specification wherein like reference characters designate corresponding parts in the several views.

In the drawings:

FIG. 5 is a sectional view taken on line 5—5 in FIG. 3;

FIG. 6 is an enlarged sectional view taken on line 6—6 in FIG. 2;

FIG. 7 is a chart illustrating the performance of the FIG. 1 embodiment; and

FIG. 8 is a diagrammatic view illustrating the operation of the FIG. 1 structure.

Figure 1:
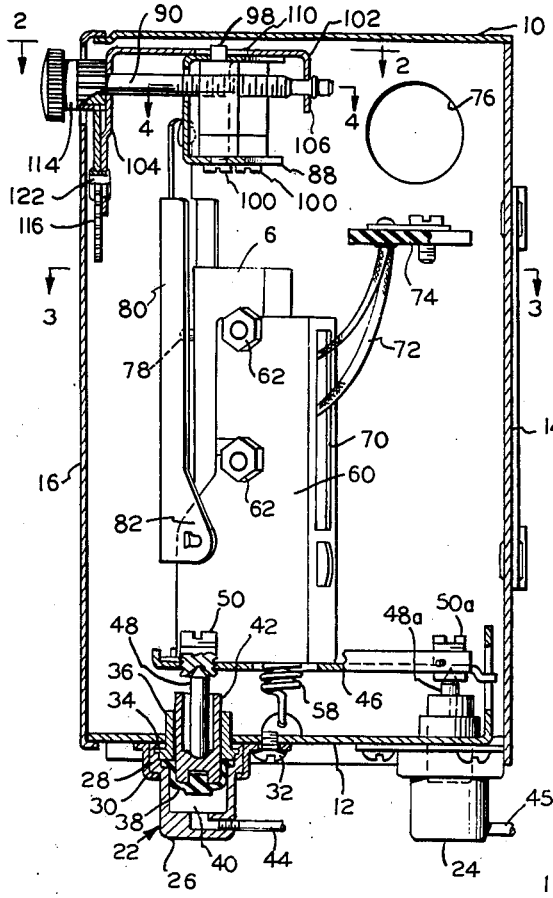
FIGURE 1 is a sectional view taken substantially on line 1—1 in FIG. 3.
Figure 4:
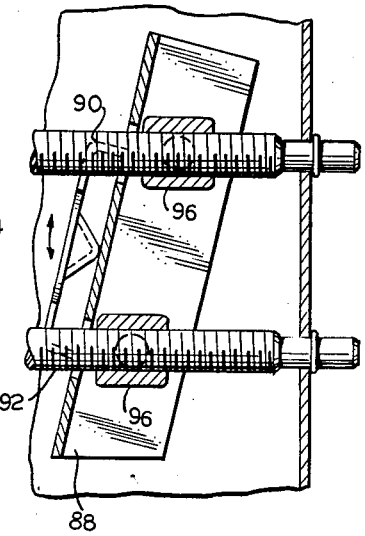
FIG. 4 is a sectional view taken on line 4—4 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIG. 8, there is diagrammatically shown a control structure for maintaining various preselected temperatures within the boiler of a domestic space heating system. The control structure comprises a conventional snap switch 6 electrically connected with the energizing circuit for the boiler's furnace, the arrangement being such as to control the furnace operation in a manner to give a selected boiler water temperature.

The diagrammatically shown control structure is operated in thermostatic response to boiler water temperature change as is conventional. However there is an additional thermostatic input from the outdoor atmosphere which modifies the effect of the boiler temperature thermostat so as to automatically give different boiler water temperatures under various different outdoor temperature conditions.

The FIG. 8 arrangement comprises an electric switch 6 having an actuator button 78 registering with a pivotally mounted operator yoke 80 which rides against an abutment or cam structure 88. Thermostatic power means 24 responsive to boiler water temperature acts to move switch casing 6 along line 7, and a second thermostatic power means 22 responsive to outdoor temperature acts to move switch casing 6 along line 8.

In operation, assuming a constant outdoor temperature the switch casing 6 will be moved back and forth only along line 7 so as to give a substantially constant boiler water temperature. However any change in outdoor temperature will cause member 88 to cam yoke 80 along line 7 such as to change the temperature at which switch 6 is actuated, the arrangement being such as to give a new boiler water temperature. Thus, on an increase in the outdoor temperature the yoke 80 may ride up on the cam surface at 88 so that the yoke is displayed to the right for thereby causing switch 6 to be actuated by a lower boiler water temperature than under previous operating conditions. Similarly, a decrease in the outdoor temperature may cause yoke 80 to ride down on cam surface 88 so that the switch is operated by structure 24 to establish a higher boiler water temperature.

As previously noted, different heating systems require different boiler water temperatures for a given outdoor temperature. In the present arrangement the control structure may be adjusted for use in different systems by means of the two set screws 90 and 92. These set screws are so arranged and mounted that rotation thereof may be utilized to vary the angular disposition of cam surface 88. For example, the cam surface may take the position denoted by character 88a, in which event a new relationship between outdoor temperature and boiler water temperature is established. By moving the cam from position 88 to position 88a the boiler water temperature for any given outdoor temperature is varied; additionally the rate of change of boiler water temperature per unit variation in outdoor temperature is changed so as to adapt the control structure to use with different heating installations.

The general relationships involved may further be understood by reference to the chart shown in FIG. 7. It will be seen from the chart that the outdoor temperature is plotted along the X axis and that the boiler water temperature is plotted along the Y axis. For a particular system a desired relationship might be one wherein an outdoor temperature of 0° F. might necessitate a boiler water temperature of 210° F. This condition is noted by numeral A on the chart. In the same system, when the outdoor temperature is 60° F. a boiler water temperature of 110° F. might be desirable. This condition is denoted by reference character B on the chart.

The arrangement of FIGS. 1 and 8 is such that these operating temperatures can be achieved by adjustment of the screws 90 and 92. Thus, screw 90 may be adjusted to provide the condition at B and screw 92 may be adjusted to provide the temperature condition at A. The illustrated abutment structure 88 is made as a straight element having a flat face engaging the operating arm 80, and accordingly the adjustment of screws 90 and 92 not only sets the operating conditions at A and B, but also sets the operating conditions along all points on the line C in the chart (FIG. 7).

The operating line C is of course selected to fit a particular heating system. With the arrangement of FIG. 1 it is possible to provide various desired operating lines charactered to fit different systems, i.e., systems having different capacities, different heating loads and different circulation problems. For example screw 90 may be adjusted to give a boiler water temperature of 150° F. at the outdoor temperature of 60° F., as denoted by character B' in FIG. 7. Similarly, screw 92 may be adjusted to provide the operating point A', the two operating points serving to establish the operating curve or line C'. The exact nature of the curve is preselected by considering the character of the heating system to be controlled.

The above description has briefly treated the structure shown in the drawings, but a better understanding of the illustrated arrangement may be had by resort to the more detailed description which follows:

Referring to FIG. 1, there is shown a housing including a top wall 10, bottom wall 12, back wall 14, front wall 16 and side walls 18 and 20. Bottom wall 12 mounts the two condition responsive power devices indicated generally by numerals 22 and 24. In the illustrated embodiment each of these power devices is of similar construction, and accordingly a description of one will suffice for a description of the other.

Power device 22 comprises a cylindrical cup-like casing 26 having a flange 28 which fits within the retainer bracket 30, said bracket having one or more screws 32 extended therethrough for mounting it and the casing onto the aforementioned housing wall 12. The flange 28 is inturned as at 34 so as to overlie an annular flange extending from the lower portion of a sleeve 36, it being understood that sleeve 36 and cup 26 cooperate to form the complete casing for the power device. The two casing elements are configured to operatively and clampingly mount the rubber diaphragm 38 at its periphery so that development of an increased pressure within the contained space 40 is effective on the diaphragm to move it and the superjacent piston 42 upwardly relative to the sleeve 36.

In the illustrated embodiment the development of pressure in chamber 40 is effected by expansion of thermal fluid within a conventional remotely located thermal bulb, said bulb being connected to the power device by means of the small diameter tubing 44. It will be appreciated that as the temperature of the bulb is increased the contained thermal fluid such as oil will develop an increased pressure in chamber 40 so as to drive the piston 42 upwardly in sleeve 36.

Upward movement of the piston 42 is utilized to move a corner portion of a plate or platform 46. As will be explained hereinafter, platform 46 is pivotally supported at three spaced points so that during upward movement of the sleeve 42 there is a tilting motion imparted to the plate. This tilting motion tends to change the angular relationship between piston 42 and platform 46, and it is therefore desirable to employ a non-binding connector such as the pin 48 between piston 42 and the platform. The non-binding connection is obtained by forming the pin with a conical tip at its upper end and by providing a conically recessed screw 50 as a seat for the pin. The lower end of the pin is spherically contoured so as to permit the pin to take slightly angled positions with respect to the axis of sleeve 42 in accordance with different tilted positions of plate 46.

Power device 22 is intended to be operated by variation in temperature of the outdoor atmosphere, whereas power device 24 is intended to be operated by variation in temperature of a bulb located in heat transfer relation to the boiler water. Power device 24 is provided with an output member similar to the previously described member 48. However in order to distinguish the output device of member 24 from the output device of member 22 reference characters 48a and 50a are given to the structures in structure 24.

As previously outline, platform 46 is supported at three spaced points, one of the support points being the pin 48, a second of the support points being the pin 48a, and the third support point being the fixed pivot pin 52 (FIG. 5). The relative positions of the three support points may be best seen in FIG. 3, and it will be appreciated that by operation of devices 22 and 24 the plate can assume various positions of tilt relative to its point of fixed fulcrumming at 52. Thus, boiler water temperature rise tends to drive pin 48a upwardly so as to tilt the platform 46 around the horizontal line or axis 54 extending through the centers of the pins 48 and 52. Similarly outdoor temperature rise tends to cause the platform 46 to be tilted upwardly about the imaginary line or axis 56 extending between the pins 48a and 52. Under certain circumstances there is a simultaneous tilting of the plate 46 about both of the axes 54 and 56. Ordinarily, the boiler water temperature change will be more rapid than the outdoor temperature change, and in the illustrative embodiment the movement around axis 54 will usually be more rapid than the movement about axis 56. The two power devices 22 and 24 operate independently of one another, and under certain circumstances the pin 48 may be moving downwardly while the pin 48a is moving upwardly, the exact movements being determined by the atmospheric conditions on the two different media. The two illustrated power devices 22 and 24 are not of the self-returning type. However, a suitable compression spring 58 is trained between the housing bottom wall 12 and structure carried by plate 46 so as to automatically return the pistons of the power devices into their casing structures in response to decrease in temperature of each atmosphere.

As previously noted, the FIG. 1 arrangement incorporates an electric switch 6 for operating a heat producer (not shown). The switch may be of the conventional snap action type and may be suitably mounted in the upstanding bracket 60 by means of the nut-bolt assemblies at 62. It will be understood that bracket 60 is of channel construction, to provide a web wall 64 and the two flanges or end walls 66 and 68, the arrangement being such as to permit the aforementioned screws 62 to extend through openings in the switch 6 and flanges 66 and 68 for effecting securement of the switch in a fixed position on the bracket. The web portion 64 may be provided with a cut-out as at 70 to accommodate the electrical leads 72. A suitable terminal board is provided at 74 for operative mounting of electrical supply cables introducible into the housing through the circular opening 76 (FIG. 1).

Figure 3:
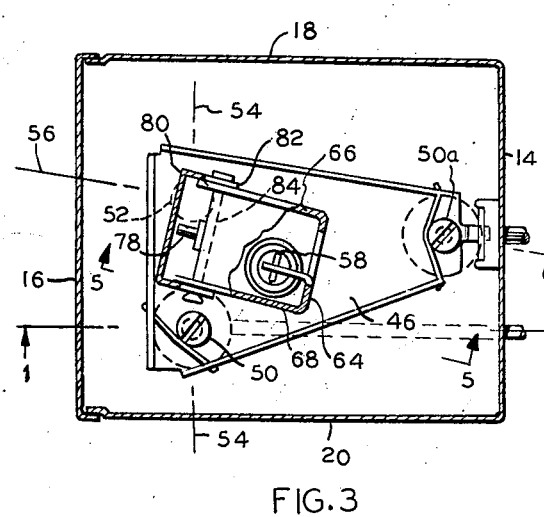
FIG. 3 is a sectional view taken on line 3—3 in FIG. 1.

The switch is provided with the conventional actuator button 78 which registers with the elongated yoke or arm 80. As seen in FIG. 3, arm 80 is of channel configuration so as to provide the two parallel ears 82 for effecting its pivotal mounting on the pivot pin 84. A suitable wire torsion spring 85 is provided to bias arm 80 in a clockwise direction (FIG. 5). The arrangement is such that as plate 46 is tilted about the axis 54 and/or axis 56 the assembly of bracket 60 and switch 6 is moved relative to the actuator arm 80. In this connection it will be noted that the upper end of arm 80 is conically configured as at 86, and the tip of the cone engages against an abutment member 88. Member 88 is adjustable as will be explained hereinafter, but after it has been adjusted to its desired position the member has no movement, and it can therefore act as a fixed abutment or cam for the spring-urged arm 80. Therefore, as either or both of the power devices 22 and 24 cause the plate 46 to be tilted the switch 6 is moved so that its actuator button 78 is depressed by movement thereof against the arm 80.

The direction of movement of button 78 necessary to close the circuit through switch 6 may be different in accordance with the character of different heating systems, but in the usual case the switch will be actuated to close its circuit when it is desired to operate the furnace. Therefore, under these conditions, temperature rise in the boiler is effective to cause a movement of the switch button 78 inwardly relative to the switch casing. The employed switch will therefore be a normally closed switch, i.e., the circuit through the switch will be closed when the button 78 is in its extended position relative to the casing.

In order to adjust the operation of the control device there are provided two manually actuable screws 90 and 92 individually meshing with respective ones of the nuts 96 and 97. As seen in FIG. 1, each of these nuts is provided at its upper and lower ends with the pivot shafts 98 and 100. Shaft 100 is preferably formed as a screw in order to permit the nut to be assembled onto the channel-shaped member 88 in which it is pivotally mounted.

Figure 2:
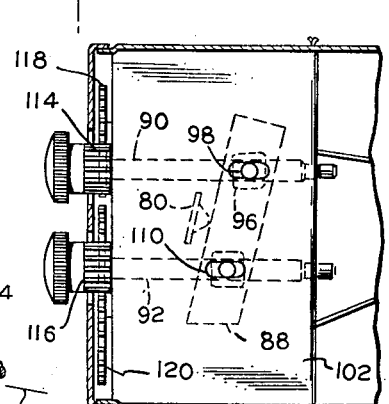
FIG. 2 is a sectional view taken on line 2—2 in FIG. 1.

It will be seen that each of the screws is journalled in a bracket structure 102 which fixedly extends between the two housing walls 18 and 20 (see FIG. 2). The bracket is provided with the two downwardly extending flanges 104 and 106 as its front and rear ends (FIG. 1), said flanges serving to operatively journal the screws for rotation. Each of the screws 90 and 92 is independently movable so as to cause the abutment structure 88 to assume different positions of adjustment. In operation of the screws it will be understood that as a respective screw is turned the corresponding nut 96 is caused to travel axially so as to carry the abutment structure 88 therewith. The pivotal mountings at 98 and 100 permit each nut to traverse the length of the screw without exerting any binding tendencies in the system. The bracket is provided with the slots 110 which receive the pivots 98 so as to accommodate contemplated changes in angle of the abutment structure 88.

The adjusted position of abutment structure 88 determines the character of actuation of switch 6, and preferably therefore the functional position of abutment structure 88 should be readily ascertainable by the installer and/or user of the apparatus. In the illustrated embodiment a suitable indicator means for this purpose is shown in FIGS. 1 and 6. The indicator means comprises a gear 114 carried by screw 90 and a gear 116 carried by screw 92. Gear 114 meshes with a toothed disc 118, and gear 116 meshes with a toothed disc 120. Both of the discs are mounted for rotary movement on the aforementioned flange 104, as by means of a rivet 122. As will be seen from FIG. 6, the toothed discs may have suitable numbering thereon for indicating the temperature settings, said numbering being viewable through the windows or openings 124 and 126 in wall 16.

In operation of the FIG. 1 embodiment, screw 90 is set to give a desired boiler water temperature indication at 124 for operations at an outdoor temperature of 60° F. (or with a different disc numbering, any other preselected temperature such as 70° F.). Similarly screw 92 is set to give a desired boiler water temperature indication at 126 for operation at an outdoor temperature of 0° F. (or with a different disc numbering, any other preselected temperature such as 5° F.). By these settings the character of the operating curve (FIG. 7) is established.

The operating curve is a function of the location of member 88 since, as previously explained in connection with FIG. 8, the member 88 location determines how far each of the power devices 22 and 24 must move to operate switch 6. As previously noted, any change in boiler water temperature swings switch 6 around axis 54 (FIG. 3), and any change in outdoor temperature swings switch 6 around axis 56. These two swinging motions in combination with the adjustment of cam 88 to its various angles serves to provide any selected boiler temperature-outdoor temperature curve (FIG. 7).

The cam 88 in FIG. 2 is a straight cam, and the curve is in the form of a straight line. However by employing a cam with a curving or varying surface contour the operating curve can be accordingly varied. Thus, for example, by employing a cam with a wave-like surface the operating curve may be wave-like in form as shown at D in FIG. 7. The character of the curve will of course be chosen in accordance with different applications.

The above description has proceeded on the basis of a domestic heating control application, but the invention has application in other fields such as refrigeration, fluid pressure regulation, and visual indicator arrangements for manual instrumentation control.

The drawings show temperature responsive power elements at 22 and 24. However it will be appreciated that for certain applications other types of power devices could be employed. For example in an installation wherein it was desired to maintain a selected relationship between the pressures in two fluid lines the control could be built to incorporate a pressure-responsive bellows structure in the spaces now occupied by structures 22 and 24. Similarly, for certain applications electric switch 6 would be replaced by a small fluid valve actuatable by a plunger located in the position now occupied by button 78. Other modifications can be made without departing from the spirit of the invention as defined by the appended claims.

We claim:
1. A condition responsive control structure, comprising a frame, a platform having a first point thereof pivotally supported on said frame, a first power device connected to said frame and operatively engaging said platform at a second point thereof, a second power device connected to said frame and operatively engaging said platform at a third point thereof, an actuator mounted on said platform, an abutment engageable with said actuator to operate the same, and means for adjusting the engageable relationship between said abutment and said actuator, whereby operation of the first power device is effective to tip the platform about an axis defined by the first and third points, and operation of the second power device is effective to tip the platform about an axis extending through said first and second points to carry said actuator into engageable relation with said abutment means.

2. The combination of claim 1 wherein the abutment structure comprises an arm structure mounted for pivotal movement on the platform structure and extending therebeyond; and the adjustment structure comprises a cam device arranged against the arm structure to have a back-and-forth adjusting motion in directions substantially parallel with the arm structure's pivot axis.

3. The combination of claim 2, wherein the adjustment structure comprises a first threaded means pivotally carried on the aforementioned cam device, a first screw means operatively connected with said threaded means to effect a swinging motion of the cam device about one point, a second threaded means movably carried on a second portion of the cam device, and a second screw means operatively connected with said second threaded means to effect a swinging motion of the cam device about a second point thereon.

4. Mechanism for establishing a comparison curve for the values of first and second conditions, comprising a device for controlling the value of first condition, an actuator, power means sensitive to fluctuations in the first condition for operating the actuator, second power means sensitive to fluctuations in the second condition for operating the actuator, and an adjustable cam adapted to engage said actuator, a first operator for imparting a first adjustable set to said cam to establish one point on the comparison curve with respect to said first power means, and a second operator for imparting a second adjustable set to said cam to establish a second point on the comparison curve with respect to said second power means.

References Cited in the file of this patent

UNITED STATES PATENTS

| | | |
|---|---|---|
| 2,404,597 | McClain | July 23, 1946 |
| 2,549,054 | Burling | Apr. 17, 1951 |
| 2,555,990 | Newton | June 5, 1951 |
| 2,819,844 | Dennick | June 14, 1958 |
| 2,849,185 | Keyes | Aug. 26, 1958 |